(12) United States Patent
Kuo et al.

(10) Patent No.: US 10,913,865 B2
(45) Date of Patent: Feb. 9, 2021

(54) MODIFIED METAL NANOPLATE AND CONDUCTIVE PASTE COMPRISING THE SAME

(71) Applicant: INDUSTRIAL TECHNOLOGY RESEARCH INSTITUTE, Hsinchu (TW)

(72) Inventors: Shin-Liang Kuo, Hsinchu (TW); Hung Ming Chang, Taichung (TW); Shu-Jiuan Huang, Taipei (TW); Jian-Yi Hang, Zhonghe (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 118 days.

(21) Appl. No.: 16/232,925

(22) Filed: Dec. 26, 2018

(65) Prior Publication Data

US 2020/0181430 A1    Jun. 11, 2020

(30) Foreign Application Priority Data

Dec. 6, 2018   (TW) .............................. 107143841 A

(51) Int. Cl.

| C09D 7/62 | (2018.01) |
| H01B 1/02 | (2006.01) |
| B82Y 30/00 | (2011.01) |
| C09D 5/24 | (2006.01) |
| C09D 7/40 | (2018.01) |
| C09D 7/20 | (2018.01) |
| B22F 1/00 | (2006.01) |
| C09D 139/06 | (2006.01) |

(52) U.S. Cl.
CPC .............. *C09D 5/24* (2013.01); *B22F 1/0044* (2013.01); *B22F 1/0062* (2013.01); *C09D 7/20* (2018.01); *C09D 7/62* (2018.01); *C09D 7/70* (2018.01); *C09D 139/06* (2013.01); *B22F 2301/10* (2013.01); *B22F 2301/255* (2013.01)

(58) Field of Classification Search
CPC ... H01B 1/02; H01B 1/20; H01B 1/22; C09D 7/62; C09D 7/70; B22F 1/0044; C08K 9/04; B82Y 20/00; B82Y 30/00; B82Y 40/00
See application file for complete search history.

(56) References Cited

U.S. PATENT DOCUMENTS

| 2011/0039078 A1 | 2/2011 | Brennan Fournet et al. |
| 2016/0251531 A1 | 9/2016 | Uchida et al. |
| 2017/0025374 A1 | 1/2017 | Fujiwara et al. |

| 2017/0169911 A1* | 6/2017 | Hu ........................... B22F 1/025 |
| 2017/0256332 A1 | 9/2017 | Miyazaki et al. |
| 2018/0179409 A1 | 6/2018 | Teragawa et al. |

FOREIGN PATENT DOCUMENTS

| CN | 102133645 A | 7/2011 |
| CN | 104650652 A | 5/2015 |
| CN | 104841945 A | 8/2015 |
| CN | 106493385 A | 3/2017 |
| CN | 106942274 A | 7/2017 |
| CN | 107705869 A | 2/2018 |
| TW | 201330738 A1 | 7/2013 |
| TW | I553660 B | 10/2016 |

OTHER PUBLICATIONS

Taiwanese Office Action and Search Report for Taiwanese Application No. 107143841, dated Mar. 3, 2020.
D.-Y. Wang et al. "Green water-based silver nanoplate conductive ink for flexible printed circuit", Materials Technology: Advanced Performance Materials, 2016, vol. 31, No. 1, pp. 32-37, 7 total pages.
Nana Xiong et al., "Synthesis and electrical properties of silver nanoplates for electronic applications", Materials Science-Poland, vol. 33(2), 2015, pp. 242-250.
Qikui Fan et al., "A Ligand-Exchange Route to Nobel Metal Nanocrystals with a Clean Surface for Enhanced Optical and Catalytic Properties", Particle and Particle Systems Characterization, 2017, vol. 1700075, pp. 1-8, 9 total pages.
Ruo-Zhou Li et al., "Robust Ag Nanoplate Ink for Flexible Electronics Packaging", RSC Publishing, Nanoscale, vol. 2013, No. 00, pp. 1-10, 11 total pages.
Young Min Park et al., "One-step synthesis of silver nanoplates with high aspect ratios: using coordination of silver ions to enhance lateral growth", RSC Adv., 2016, vol. 6, pp. 95768-95773.
Zhiqing Xin et al., "Preparation of Triangular Silver Nanoplates and its Application in Printed Electronics", Applied Mechanics and Materials, vol. 748(2015), pp. 153-156.

* cited by examiner

*Primary Examiner* — Haidung D Nguyen

(74) *Attorney, Agent, or Firm* — Birch, Stewart, Kolasch & Birch, LLP

(57) ABSTRACT

A modified metal nanoplate and a conductive paste including the same are provided. The modified metal nanoplate includes a metal nanoplate, a first protecting agent, and a second protecting agent. The metal nanoplate has an average width of 0.3-20 μm and an average thickness of 10-35 nm. The first protecting agent is disposed on a surface of the metal nanoplate and includes an oxygen-containing polymer. The second protecting agent is disposed on the surface of the metal nanoplate and includes a C6-C12 alkylamine.

18 Claims, 2 Drawing Sheets

MODIFIED METAL NANOPLATE AND CONDUCTIVE PASTE COMPRISING THE SAME

CROSS REFERENCE TO RELATED APPLICATIONS

The present application is based on, and claims priority from, Taiwan Application Serial Number 107143841, filed on Dec. 6, 2018, the disclosure of which is hereby incorporated by reference herein in its entirety.

TECHNICAL FIELD

The present disclosure relates to a modified metal nanoplate and a conductive paste including the same.

BACKGROUND

With the developments being made in the fields of consumer electronics and printed electronic technology, the requirements on the electrical specification of wiring and conductive layers formed of conductive pastes for applications such as flexible printed circuit boards, electromagnetic wave shielding, and radio frequency identification (RFID) have continuously increased. For example, for applications of thinning lines, high frequency electromagnetic wave shielding, ultra-high frequency (UHF) radio frequency identification technology and the like, it is required to use a conductive paste with extremely high conductivity. However, as the conductive medium in the conductive paste is usually a metal material, the characteristics of the metal material have a critical influence on the conductivity provided by the conductive paste.

In the current technique, metal nanoparticles having an average particle diameter of less than 50 nm or metal complexes, e.g. silver nanoparticles or silver complexes, are often used as the main raw material of a conductive paste. Due to the quantum effect of metal nanoparticles, the inherent conductivity of metal nanoparticles is poor. Even though metal nanoparticles have a low melting point, the conductive paste that includes metal nanoparticles still requires further high temperature thermal treatments, so that good conductive paths between the metal nanoparticles may be formed through the sintered states within the metal nanoparticles. Therefore, the as-formed conductive film is not capable of having high conductivity if it is not subjected to one or more high temperature thermal treatments. Besides, when a metal complex is used as the main raw material of a conductive paste, although the thermal decomposition temperature of the metal complex is low, the large amount of chelating molecules from the metal complex results in a relatively low metal content in the conductive paste. This may also have an adverse effect on the compactness and conductivity of the conductive film after it is subjected to one or more thermal decomposition treatments.

Moreover, in the current technique, in the manufacturing process of metal nanomaterials, e.g. silver nanomaterials, a large amount of polymer materials serving as protecting agents to facilitate the dispersion of the metal nanomaterials are used in order to make the nano-metal grow along a specific crystal plane. However, these polymers have substantially low conductivity, e.g. substantially non-conductive, and have a relatively strong interaction with a specific crystal plane of the metal. Therefore, the non-conductive polymers covering the surface of the nano-metal cannot be fully removed effectively by a simple water-washing process and/or a solvent-cleaning process. A high thermal decomposition temperature, e.g. at a temperature of higher than 300° C., is required to remove the non-conductive polymer materials, otherwise the polymer materials present between the metal nanomaterials, e.g. between silver nanoparticles, can block the contact between the metal nanomaterials as well as the formation of conductive paths. However, plastic substrates such as polyethylene terephthalate (PET) or polyimide (PI) are still used to form conductive films thereon in many applications. The low heat resistance characteristics of plastic substrates limit the thermal treatment temperature of the conductive paste.

Therefore, industry needs a metal material with a good film forming ability and good conductivity and a conductive paste including the same.

SUMMARY

According to an embodiment of the present disclosure, a modified metal nanoplate is provided. The modified metal nanoplate includes a metal nanoplate, a first protecting agent, and a second protecting agent. The metal nanoplate has an average width of 0.3-20 μm and an average thickness of 10-35 nm. The first protecting agent is disposed on a surface of the metal nanoplate, and the first protecting agent includes an oxygen-containing polymer. The second protecting agent is disposed on the surface of the metal nanoplate, and the second protecting agent includes a C6-C12 alkylamine.

According to another embodiment of the present disclosure, a conductive paste is provided. The conductive paste includes a plurality of the aforementioned modified metal nanoplates and a solvent. The modified metal nanoplates are dispersed in the solvent.

DETAILED DESCRIPTION

Figure 1:
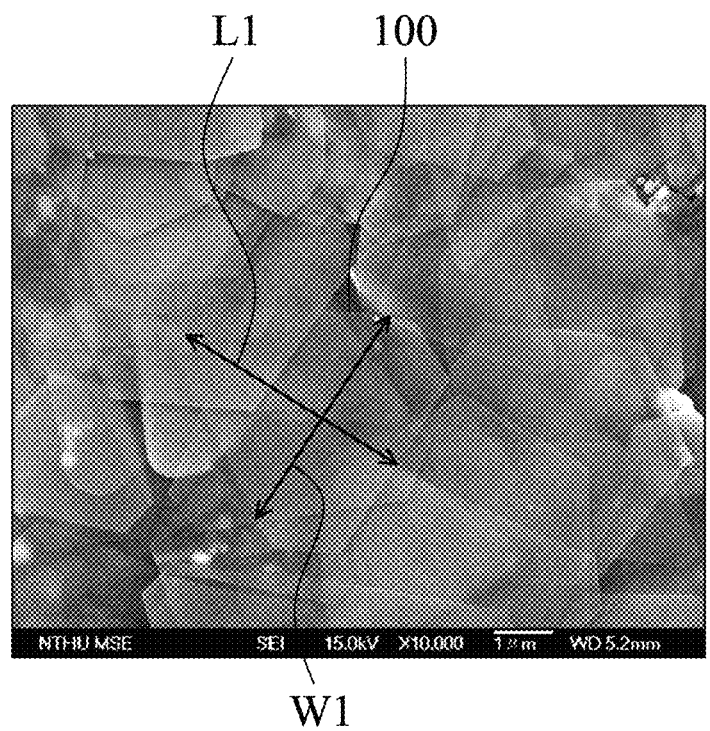
FIG. 1 is a top-view SEM image of a modified metal nanoplate according to an embodiment of the present disclosure.

Details of embodiments of the present disclosure are described hereinafter with accompanying drawings. Specific compositions disclosed in the embodiments are used as examples and for explaining the disclosure only and are not to be construed as limitations. A person having ordinary skill in the art may modify or change corresponding compositions of the embodiments according to actual application.

Unless explicitly indicated by the description, as used herein, the singular forms "a," "an" and "the" are intended to include the plural forms as well, unless the context clearly indicates otherwise. It should be further understood that when such as the term "includes" and/or "including," is used in this specification, it specifies the presence of described features, steps, operations, elements, and/or components, but does not preclude the presence or addition of one or more other features, steps, operations, elements, components, and/or groups thereof.

Throughout this specification, the term "one embodiment" or "an embodiment" means that a particular feature, structure, or characteristic described in connection with the embodiment is included in at least one embodiment. Thus, the phrases "in one embodiment" or "in an embodiment" in various contexts throughout this specification do not necessarily all refer to the same embodiment. Furthermore, the particular features, structures, or characteristics may be combined in any suitable manner in one or more embodiments. It should be appreciated that the following figures are not drawn to scale; rather, these figures are merely illustrations In the embodiments of the present disclosure, the modified metal nanoplate includes a relatively thin metal nanoplate, and a first protecting agent and a second protecting agent having a relatively low thermal decomposition temperature are disposed on the surface of the metal nanoplate. As such, the conductive paste including the modified metal nanoplate has a good film forming ability, and the conductive film formed from the conductive paste has flexibility and excellent conductivity without any pressurizing or high temperature thermal treatments performed on the conductive paste.

According to the embodiments of the present disclosure, a modified metal nanoplate is provided hereinafter. According to the embodiments of the present disclosure, the conductive paste including the modified metal nanoplate can be used for manufacturing a conductive thin film having flexibility and good conductivity.

In the embodiments of the present disclosure, the modified metal nanoplate includes a metal nanoplate, a first protecting agent, and a second protecting agent. The metal nanoplate has an average width of 0.3-20 μm and an average thickness of 10-35 nm. The first protecting agent is disposed on the surface of the metal nanoplate, and the first protecting agent includes an oxygen-containing polymer. The second protecting agent is disposed on the surface of the metal nanoplate, and the second protecting agent includes a C6-C12 alkylamine.

According to the embodiments of the present disclosure, the metal nanoplate has the average width of 0.3-20 μm and the average thickness of 10-35 nm, such that the modified metal nanoplates in stacks are provided with larger stacked contact areas along the width dimension(s) and/or the length dimension(s). It is beneficial to the formation of good conductive paths between multiple modified metal nanoplates through stacked contacting. The relatively low average thickness makes the modified metal nanoplate flexible, such that voids or gaps are hardly formed between the multiple modified metal nanoplates that are contacting to one another in stacks, and thus the modified metal nanoplates are provided with good and stable stacked compactness. Accordingly, the conductive paste including the modified metal nanoplates can have good processing characteristics, thus it may be not required to perform any high temperature sintering processes on the conductive paste, and the conductive thin film formed from the conductive paste can still have excellent and stable conductivity.

When the thickness of the metal nanoplate is too large, e.g. above 35 nm, the thick metal nanoplate has a relatively strong rigidity. Particularly, in a wet coating process or a printing process without applying any external force, the thick metal nanoplate has relatively poor stacking characteristics, thus the conductive paste has a relatively poor film forming ability, and the conductive thin film formed from the conductive paste has a relatively poor flexibility. On the other hand, when the size of the metal nanoplate is too small, for example, the metal nanoplate has a thickness of less than 10 nm and/or a width of less than 0.3 μm, it is more difficult to form effective electrical connection between the metal nanoplates.

In contrast, according to the embodiments of the present disclosure, the metal nanoplate has the average width of 0.3-20 μm and the average thickness of 10-35 nm, such that the conductive paste including the modified metal nanoplate has good self-stacking and film forming abilities, thus it may be not required to perform any high temperature sintering processes on the conductive paste, and the conductive thin film formed from the conductive paste can still have excellent and stable conductivity.

According to the embodiments of the present disclosure, the first protecting agent on the surface of the modified metal nanoplate provides good protection and dispersion. In addition, the second protecting agent includes a C6-C12 alkylamine, and the structure of the C6-C12 alkylamine has nitrogen atoms having lone pair electrons, so that the second protecting agent can be chemically adsorbed to the surface of the metal nanoplate, and thus is can provide stable protection and dispersion effects. Moreover, the second protecting agent has a relatively low thermal decomposition temperature. As such, the conductive thin film formed from the conductive paste including the modified metal nanoplate may require low-temperature thermal treatments, e.g. a thermal treatment performed at a temperature of lower than 200° C., for removing the solvent and most of the second protecting agent. In this way, the conductive thin film formed from the conductive paste can be provided with excellent and stable conductivity, high temperature sintering processes for removing polymer materials having low conductivity may be not required, and the plastic substrate under the conductive thin film is not damaged from high temperature processes.

In some embodiments, the modified metal nanoplate may include 0.1-5.0 parts by weight of the first protecting agent relative to 100 parts by weight of the metal nanoplates.

When the content of the first protecting agent is above 5.0 parts by weight, the non-conductive first protecting agent may not be effectively removed by low-temperature thermal processes, and the excess first protecting agent remained in the conductive thin film may seriously affect the conductivity of the conductive thin film. When the content of the first protecting agent is less than 0.1 parts by weight, the first protecting agent may not be able to provide enough protection and dispersion effects, and the strong van der Waals force between the metal nanoplates may render the metal nanoplates to self-agglomerate and form micron-sized metal agglomerates. As such, even with additional dispersing agents added subsequently, effective dispersion may not be achieved, and issues of poor morphology smoothness, voids formed in the structure, poor stacked compactness, and lacking flexibility may occur to the conductive thin film formed from the conductive paste including micron-sized metal agglomerates. As a result, a conductive thin film having good film forming ability and conductivity may not be formed. In contrast, according to some embodiments of the present disclosure, when the content of the first protecting agent is 0.1-5.0 parts by weight, enough protection and dispersion effects can be provided, and it is beneficial to provide a good film forming ability.

In some embodiments, the modified metal nanoplate includes such as 0.01-5.0 parts by weight of the second protecting agent relative to 100 parts by weight of the metal nanoplate.

In some embodiments, the weight of the second protecting agent may be 1-100 wt % of the weight of the first protecting agent.

When the weight of the second protecting agent is less than 1 wt % of the weight of the first protecting agent, the content of the second protecting agent is too low. As such, the modified metal nanoplate nearly includes the first protecting agent having a higher thermal decomposition temperature, and thus the subsequent high temperature thermal decomposition process is unavoidable. When the weight of the second protecting agent is larger than 100 wt % of the weight of the first protecting agent, the content of the second protecting agent is too high. As such, the content ratio of the first protecting agent is reduced correspondingly, resulting in providing insufficient protection and dispersion effects for the metal nanoplates, and thus having adverse influence on the conductivity of the as-formed conductive thin film. In contrast, according to some embodiments of the present disclosure, when the weight of the second protecting agent is, for example, 1-100 wt % of the weight of the first protecting agent, sufficient protection and dispersion effects can be provided, and it is beneficial to the formation of a conductive thin film having good film forming ability and conductivity and requiring low-temperature thermal treatments.

In some embodiments, the oxygen-containing polymer may include polyvinyl pyrrolidone (PVP), polyvinyl alcohol (PVA), polyethylene glycol (PEG), or any combination thereof. In some embodiments, the oxygen-containing polymer may be polyvinyl pyrrolidone (PVP) having a weight-average molecular weight of about 40,000 to 1,300,000.

In some embodiments, the second protecting agent includes a C6-C12 alkylamine.

When the carbon number of the alkylamine is less than 6, the chemical adsorption is too strong, resulting in a relatively poor chemical adsorption of the oxygen-containing polymer of the first protecting agent compared with that of the second protecting agent. As such, in the competition reaction where the first and second protecting agents are both binding to the metal nanoplates, the adsorption amount of the first protecting agent being too small may occur. As a result, the first protecting agent cannot provide the desired protection and dispersion effects, agglomeration of metal nanoplates occur, thereby the conductivity of the as-formed film is poor. When the carbon number of the alkylamine is more than 12, the alkylamine has a relatively high thermal decomposition temperature, resulting in requiring high temperature thermal treatments, e.g. a thermal treatment performed at a temperature of higher than 200° C., to remove the second protecting agent. In contrast, according to the embodiments of the present disclosure, the second protecting agent is a C6-C12 alkylamine, for example, and stable protection and dispersion effects can be provided to the metal nanoplates in the conductive paste, and the second protecting agent can be removed by a low-temperature thermal treatment in the film formation, such that no high-temperature sintering processes may be required on the conductive paste, and the conductive thin film formed from the conductive paste can still have excellent and stable conductivity.

In some embodiments, the C6-C12 alkylamine includes n-hexylamine, n-octylamine, isooctylamine, n-decylamine, n-dodecylamine, or any combination thereof.

In some embodiments, the metal nanoplate includes silver, silver alloy, copper, copper alloy, or any combination thereof.

In some embodiments, the average length of the metal nanoplate may be 0.3-20 μm, for example, wherein the extending direction of the average length is perpendicular to the extending direction of the average thickness, and the extending direction of the average length is perpendicular to the extending direction of the average width.

According to the embodiments of the present disclosure, in the modified metal nanoplate, the metal nanoplate has the average width of 0.3-20 μm and the average thickness of 10-35 nm, such that the metal nanoplate has a paper-like thin plate structure, voids or gaps are hardly formed between the multiple modified metal nanoplates that are contacting to one another in stacks, and thus the modified metal nanoplates are provided with a high film forming ability by self-stacking and good and stable stacked compactness. As such, the conductive paste including the modified metal nanoplate can have good processing characteristics, thus it may be not required to perform any high temperature sintering processes on the conductive paste, and the conductive thin film formed from the conductive paste can still have excellent and stable conductivity.

In some embodiments, the average width of the metal nanoplate may be 1-10 μm.

In some embodiments, the average thickness of the metal nanoplate may be 15-30 nm.

According to the embodiments of the present disclosure, a conductive paste is provided hereinafter. According to the embodiments of the present disclosure, the conductive paste includes the aforementioned modified metal nanoplates and a solvent, and the modified metal nanoplates are dispersed in the solvent.

In some embodiments, the conductive paste may not include a non-volatile protecting agent, a non-volatile dispersion agent, an adhesion agent, or any combinations thereof, which are usually added for providing protection and/or dispersion effects. For example, in some embodiments, the conductive paste may not include fatty acid, acrylic acid ester, or the combination thereof.

According to the embodiments of the present disclosure, the first protecting agent and the second protecting agent having a relatively low thermal decomposition temperature disposed on the surface of the metal nanoplate can provide stable protection and dispersion effects. In addition, the flexible sheet structure of the modified metal nanoplate is provided with a high film forming ability by self-stacking and good and stable stacked compactness, thereby additional dispersion agents and/or protecting agent, e.g. fatty acid and/or acrylic acid ester having high thermal decomposition temperatures, are not required to be added into the conductive paste. As such, it may be not required to perform any high temperature sintering processes on the conductive paste, and the conductive thin film formed from the conductive paste without additional dispersion agents and/or protecting agents can be provided with excellent and stable conductivity.

In some embodiments, the solvent may include isopropanol, diethylene glycol monoethyl ether, diethylene glycol butyl ether, diethylene glycol monoethyl ether acetate, or any combination thereof.

According to the embodiments of the present disclosure, the solid content of the conductive paste may be adjusted within the range of 5-80 wt % according to the coating process and/or the printing process used and the target thickness of the coating layer. In some embodiments, the solid content of the conductive paste may be 5-80 wt %. In some embodiments, the solid content of the conductive paste may be 20-30 wt %.

Further explanation is provided with the following examples. Compositions of modified metal nanoplates of embodiments and comparative embodiments and the measured results of electrical properties of the conductive silver films formed from the conductive pastes including the compositions of modified metal nanoplates of embodiments and comparative embodiments are listed for showing the properties of the modified metal nanoplate and the conductive pastes formed according to the embodiments of the disclosure. In the following embodiments and comparative embodiments, silver nanoplates are used as an example of the metal nanoplates. However, the following examples are for purposes of describing particular embodiments only, and are not intended to be limiting.

Manufacturing processes of the modified silver nanoplates of embodiments 1-10 are as follows:

Referring to China patent application no. 102133645, silver nitrate was used as the silver precursor (purchased from Super Spark International, Ltd. Co., purity>99.0%). 1.5 g of silver nitrate was dissolved in 40 mL of deionized water to prepare a silver nitrate aqueous solution. 3.0 g of polyvinyl pyrrolidone (PVP) and 1.67 g of glucose were dissolved in another 40 mL of deionized water as a reducing solution. The silver nitrate aqueous solution was added dropwise at a constant speed into the reducing solution under stirring at room temperature, the stirring continued for another 30 minutes after the completion of the dropwise addition, and then a yellow solution was obtained. The obtained mixture solution was placed at 80° C. for 72 hours, and then the color of the solution turned to silvery gray, which was a suspension solution including silver nanoplates and spherical silver nanoparticles.

Next, after the suspension solution was cooled to room temperature, it was treated by centrifugation at a speed of 5000 rpm/10 minutes, and then the upper liquid layer containing more of the spherical silver nanoparticles than the silver nanoplates was poured out. Then the remaining solution was added with deionized water, stirred, and centrifuged again, and then the above steps were repeated twice to obtain a silver nanoplate concentrate having a solid content of about 50 wt %. As such, silver nanoplates were synthesized. The surface morphology of the prepared silver nanoplates was analyzed by scanning electron microscopy (JEOL/JSM6500F). The average width of the silver nanoplates was a statistic result obtained from optical microscope images of over 100 sample plates. The thickness of the silver nanoplates was analyzed using an SEM image.

Table 1 showed the compositions, addition amounts of components, and reaction conditions of the modified silver nanoplates of embodiments 1-10, each of which was prepared by performing a replacement process on a first protecting agent with a second protecting agent. (The silver nanoplate concentrates were diluted with isopropanol, added with different amounts of n-hexylamine, n-octylamine, and n-dodecylamine (second protecting agent) respectively, and then reacted under 30-80° C. for two hours for performing the replacement process of PVP (first replacing agent). The resultant solutions were then centrifuged and washed with solvents twice, and then modified silver nanoplates having various surface properties were obtained. The surface compositions of the modified silver nanoplates of the embodiments were analyzed by thermogravimetric analyzer (TGA). As the thermal decomposition temperature of PVP is about 300° C., the weight loss within the range of 275-550° C. was regarded as the content of PVP (first protecting agent), and the weight loss within the low-temperature zone was regarded as the content of the second protecting agent having a lower thermal decomposition temperature. The modified silver nanoplates can be further washed with a large amount of solvents to further measure the contents of organic molecules using by gas chromatography (GC) or liquid chromatography (LC).

TABLE 1

|  | Embodiment 1 | Embodiment 2 | Embodiment 3 | Embodiment 4 | Embodiment 5 |
| --- | --- | --- | --- | --- | --- |
| Concentration of silver nanoplate (parts by weight) | 6 | 6 | 6 | 6 | 6 |
| Solvent | Isopropanol | Isopropanol | Isopropanol | Isopropanol | Isopropanol |
| Second protecting agent | n-hexylamine | n-octylamine | n-octylamine | n-octylamine | n-octylamine |
| Addition amount of second protecting agent | 3.0 | 3.0 | 3.0 | 8.0 | 4.5 |
| Reaction temperature (° C.) | 70 | 80 | 80 | 80 | 80 |
| Reaction time (hour) | 2.0 | 2.0 | 2.0 | 2.0 | 2.0 |

|  | Embodiment 6 | Embodiment 7 | Embodiment 8 | Embodiment 9 | Embodiment 10 |
| --- | --- | --- | --- | --- | --- |
| Concentration of silver nanoplate (parts by weight) | 6 | 6 | 6 | 6 | 6 |
| Solvent | Isopropanol | Isopropanol | Isopropanol | Isopropanol | Isopropanol |
| Second protecting agent | n-octylamine | n-dodecylamine | n-dodecylamine | n-dodecylamine | n-octylamine |
| Addition amount of second protecting agent | 3.0 | 3.0 | 2.25 | 4.5 | 6.0 |

TABLE 1-continued

| | | | | | |
|---|---|---|---|---|---|
| Reaction temperature (° C.) | 80 | 70 | 80 | 80 | 80 |
| Reaction time (hour) | 2.0 | 2.0 | 2.0 | 2.0 | 2.0 |

The modified silver nanoplates of comparative embodiments 1-2 were commercial available products. The modified silver nanoplates of comparative embodiments 3-18 were manufactured by processes similar to those above for the embodiments, the replacement process were performed with a fixed addition amount of 3.0 parts by weight of a second protecting agent at a reaction temperature of 80° C. for a reaction time of 2 hours. The major differences between these silver nanoplates were the selections of the first protecting agent and the second protecting agent. Please refer to table 3 hereinafter, the compositions of comparative embodiments 1-6 and 8 merely included one protection agent, and the selections of the second protecting agents for comparative embodiments 7 and 9-18 were listed in table 3.

Manufacturing processes of the conductive silver pastes of embodiments 1-10 and comparative embodiments 1-18 and the conductive silver films formed therefrom were as follows:

A suitable amount of isopropanol or diethylene glycol monoethyl ether was added into the aforementioned modified silver nanoplates, the solid content was adjusted to be 20-30 wt %, and then the contents were mixed and dispersed by mechanical stirring for 3 minutes to 1 hour to prepare a conductive silver paste containing modified silver nanoplates. A small amount of the conductive silver paste was placed on a black polyimide (PI) thin film having a thickness of 25 μm, and a coating process was performed on the paste with a No. 7 RDS bar at a coating rate of 25 mm/s. Then the coating was placed in a hot air circulating oven at a temperature of 100° C. or 180° C. for a thermal treatment for 30 minutes. The dried conductive silver film had a thickness of about 200-350 nm. After the thermal treatment was completed, the polyimide film with a conductive silver film formed on its surface was taken out from the oven and cooled to room temperature. The surface resistance of the conductive silver film was measured by a four-point probe, and the resistivity of the conductive silver film is obtained by calculation from the measured surface resistance, which was calculated according to the solid content and the film thickness.

Taking Embodiment 1 as an example, the silver nanoplate having an average width of 3.2 μm and a thickness of 15-30 nm was treated with n-hexylamine, and the as-formed modified silver nanoplate included two protecting agents of PVP and n-hexylamine.

Figure 2:
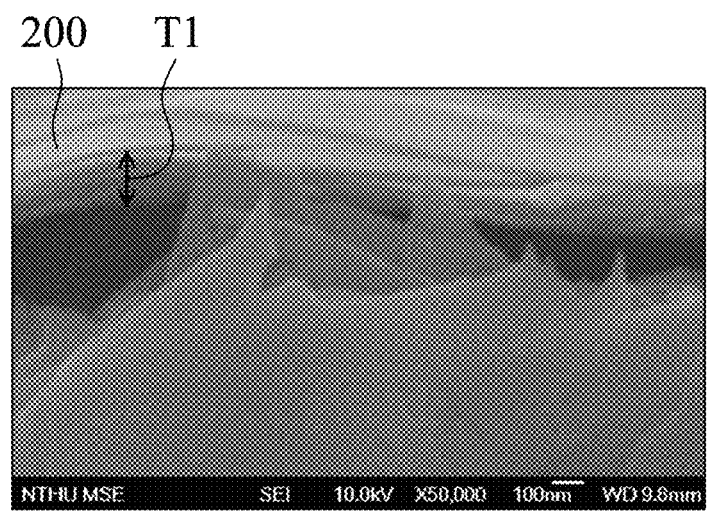
FIG. 2 is a cross-sectional view SEM image of a thin film formed from a conductive paste according to an embodiment of the present disclosure.

FIG. 1 is a top-view SEM image of a modified metal nanoplate according to embodiment 1 of the present disclosure, and FIG. 2 is a cross-sectional view SEM image of a thin film formed from a conductive paste according to embodiment 1 of the present disclosure.

As shown in FIG. 1, the modified metal nanoplate (silver nanoplate) 100 has a paper-like thin plate structure, and the modified silver nanoplates 100 are compactly stacked. As shown in FIG. 1, since the modified metal nanoplates 100 have irregular top-view shapes, the two extending distances along two extending directions, which are perpendicular to each other and extend on the plane perpendicular to the thickness of the modified silver nanoplate 100, are defined as the width and the length of the modified metal nanoplate 100. The average width and the average length of the present disclosure are obtained based on these definitions. As shown in FIG. 1, the extending direction of the width W1 and the extending direction of the length L1 of the modified metal nanoplate 100 are perpendicular to each other.

As shown in FIG. 2, the conductive silver film 200 has a thickness T1 of about 200 nm after dried by a thermal treatment at 100° C. for 30 minutes. As shown in the cross-sectional view of FIG. 2, the conductive silver film 200 has a compactly stacked structure.

Compositions of modified silver nanoplates of embodiments 1-10 and comparative embodiments 1-18 and the measured results of electrical properties of the conductive silver films formed from the conductive silver pastes including the compositions of modified silver nanoplates of embodiments 1-10 and comparative embodiments 1-18 are listed in table 2 and table 3. In tables 2-3, "PVP" represents polyvinyl pyrrolidone (PVP), contents of silver nanoplates are all 100 parts by weight, "average width (μm)" represents the average width of the silver nanoplates, "thickness range (nm)" represents the thickness range of the silver nanoplates in the conductive silver pastes of the embodiment or the comparative embodiment, "ratio of protecting agents ($2^{nd}/1^{st}$)" represents the ratio of the weight of the second protecting agent to the weight of the first protecting agent, "surface resistance ($\Omega/\square$)@100° C./30 min" represents the surface resistance of the conductive silver film after a thermal treatment at 100° C. for 30 minutes, "resistivity ($\Omega$-cm)@100° C./30 min" represents the resistivity of the conductive silver film after a thermal treatment at 100° C. for 30 minutes, and "resistivity ($\Omega$-cm)@180° C./30 min" represents the resistivity of the conductive silver film after a thermal treatment at 180° C. for 30 minutes.

TABLE 2

| | Embodiment 1 | Embodiment 2 | Embodiment 3 | Embodiment 4 | Embodiment 5 |
|---|---|---|---|---|---|
| Average width (μm) | 3.2 | 3.2 | 3.2 | 3.0 | 3.0 |
| Thickness range (nm) | 15-30 | 15-30 | 15-30 | 15-30 | 15-30 |
| First protecting agent | PVP | PVP | PVP | PVP | PVP |
| Content of first protecting agent (parts by weight) | 0.56 | 0.58 | 1.79 | 1.43 | 0.92 |
| Second protecting agent | n-hexylamine | n-octylamine | n-octylamine | n-octylamine | n-octylamine |

TABLE 2-continued

|  |  |  |  |  |  |
|---|---|---|---|---|---|
| Content of second protecting agent (parts by weight) | 0.10 | 0.17 | 0.17 | 0.53 | 0.05 |
| Ratio of protecting agents (2nd/1st) | 18.4% | 30.1% | 9.6% | 37.2% | 5.6% |
| Surface resistance ($\Omega/\square$)@100° C./30 min | 0.18 | 0.18 | 0.44 | 0.28 | 0.33 |
| Resistivity ($\Omega$-cm)@100° C./30 min | $5.2 \times 10^{-6}$ | $5.5 \times 10^{-6}$ | $9 \times 10^{-6}$ | $7.8 \times 10^{-6}$ | $9.4 \times 10^{-6}$ |

|  | Embodiment 6 | Embodiment 7 | Embodiment 8 | Embodiment 9 | Embodiment 10 |
|---|---|---|---|---|---|
| Average width (μm) | 3.7 | 3.2 | 3.2 | 6.9 | 6.9 |
| Thickness range (nm) | 15-30 | 15-30 | 15-30 | 15-30 | 15-30 |
| First protecting agent | PVP | PVP | PVP | PVP | PVP |
| Content of first protecting agent (parts by weight) | 4.78 | 2.53 | 1.77 | 1.8 | 1.13 |
| Second protecting agent | n-octylamine | n-dodecylamine | n-dodecylamine | n-dodecylamine | n-octylamine |
| Content of second protecting agent (parts by weight) | 1.04 | 0.38 | 0.19 | 1.0 | 0.61 |
| Ratio of protecting agents (2nd/1st) | 21.6% | 15.1% | 11.0% | 55.6% | 54.0% |
| Surface resistance ($\Omega/\square$)@100° C./30 min | 0.30 | 0.37 | 0.21 | 0.146 | 0.19 |
| Resistivity ($\Omega$-cm)@100° C./30 min | $6.7 \times 10^{-6}$ | $9.3 \times 10^{-6}$ | $7.2 \times 10^{-6}$ | $4.6 \times 10^{-6}$ | $6.5 \times 10^{-6}$ |

TABLE 3

|  | Comparative embodiment 1[1] | Comparative embodiment 2[2] | Comparative embodiment 3 | Comparative embodiment 4 | Comparative embodiment 5 | Comparative embodiment 6 |
|---|---|---|---|---|---|---|
| Average width (μm) | 0.3-0.5 | 1.5-2.5 | 3.2 | 3.2 | 3.2 | 3.0 |
| Thickness range (nm) | 40-50 | 50-70 | 2-30 | 20-30 | 20-30 | 20-30 |
| First protecting agent | Stearic acid | Stearic acid | PVP | PVP | PVP | PVP |
| Content of first protecting agent (parts by weight) | 0.7 | 0.5 | 4.72 | 3.04 | 4.21 | 2.97 |
| Second protecting agent | — | — | — | — | — | — |
| Content of second protecting agent (parts by weight) | — | — | — | — | — | — |
| Ratio of protecting agents (2nd/1st) | — | — | — | — | — | — |
| Surface resistance ($\Omega/\square$)@100° C./30 min | 9450 | 8880 | — | — | 87.5 | 7.5 |
| Resistivity ($\Omega$-cm)@100° C./30 min | $3 \times 10^{-1}$ | $3 \times 10^{-1}$ | — | — | $1.8 \times 10^{-3}$ | $3.2 \times 10^{-4}$ |
| Resistivity ($\Omega$-cm)@180° C./30 min | — | — | $1.7 \times 10^{-4}$ | $1.2 \times 10^{-4}$ | — | — |

TABLE 3-continued

|  | Comparative embodiment 7 | Comparative embodiment 8 | Comparative embodiment 9 | Comparative embodiment 10 | Comparative embodiment 11 | Comparative embodiment 12 |
|---|---|---|---|---|---|---|
| Average width (μm) | 3.0 | 3.7 | 3.7 | 3.2 | 3.2 | 3.7 |
| Thickness range (nm) | 20-30 | 20-30 | 20-30 | 20-30 | 20-30 | 20-30 |
| First protecting agent | PVP | PVP | PVP | PVP | PVP | PVP |
| Content of first protecting agent (parts by weight) | 2.09 | 0.31 | 1.87 | 3.19 | 4.33 | 1.64 |
| Second protecting agent | diethylamine | — | n-butylamine | n-butylamine | ethanolamine | 2-ethylhexanoic acid |
| Content of second protecting agent (parts by weight) | 0.4 | — | 0.02 | 0.40 | 1.69 | 0.33 |
| Ratio of protecting agents ($2^{nd}/1^{st}$) | 19.0% | — | 1.1% | 12.4% | 39.0% | 20.1% |
| Surface resistance ($\Omega/\square$)@100° C./30 min | — | 3.3 | 3.0 | — | — | 2.44 |
| Resistivity ($\Omega$-cm)@100° C./30 min | — | $1.1 \times 10^{-4}$ | $6.3 \times 10^{-5}$ | — | — | $8.2 \times 10^{-5}$ |
| Resistivity ($\Omega$-cm)@180° C./30 min | $1.4 \times 10^{-4}$ | — | — | $3.2 \times 10^{-5}$ | $1.9 \times 10^{-3}$ | — |

|  | Comparative embodiment 13 | Comparative embodiment 14 | Comparative embodiment 15 | Comparative embodiment 16 | Comparative embodiment 17 | Comparative embodiment 18 |
|---|---|---|---|---|---|---|
| Average width (μm) | 3.7 | 3.7 | 3.7 | 6.3 | 4.6 | 5.9 |
| Thickness range (nm) | 20-30 | 20-30 | 20-30 | 35-50 | 25-45 | 60-120 |
| First protecting agent | PVP | PVP | PVP | PVP | PVP | PVP |
| Content of first protecting agent (parts by weight) | 2.11 | 2.63 | 6.3 | 0.58 | 0.31 | 0.81 |
| Second protecting agent | Stearic acid | Dodecanethiol | n-octadecyl amine | n-dodecyl amine | n-dodecyl amine | n-octylamine |
| Content of second protecting agent (parts by weight) | 2.46 | 12.9 | 2.2 | 0.38 | 0.33 | 0.36 |
| Ratio of protecting agents ($2^{nd}/1^{st}$) | 117% | 490% | 34.9% | 65.5% | 106% | 44.4% |
| Surface resistance ($\Omega/\square$)@100° C./30 min | 16.8 | 8000 | 19.3 | 1.7 | 1.6 | 1.3 |
| Resistivity ($\Omega$-cm)@100° C./30 min | $5.6 \times 10^{-4}$ | $2.6 \times 10^{-1}$ | $6.4 \times 10^{-4}$ | $5.6 \times 10^{-5}$ | $5.2 \times 10^{-5}$ | $4.3 \times 10^{-5}$ |

[1]Silver nanoplates are commercial product N300 purchased from Tokusen.
[2]Silver nanoplates are commercial product M13 purchased from Tokusen.

As shown in tables 2-3, after a low-temperature thermal treatment at 100° C. is performed, the resistivity of the conductive silver film of embodiments 1-10 are all lower than $1 \times 10^{-5}$ $\Omega$-cm, which is apparently lower than the resistivity of the conductive silver films of all of the comparative embodiments.

As shown in table 3, the conductive silver films of comparative embodiments 1-6 and 8 all include merely one protecting agent, and stearic acid and PVP both have high thermal decomposition temperatures of over 350° C. Accordingly, the conductive silver films of comparative embodiments 1-6 and 8 are merely subjected to low-temperature thermal treatments and thus all have resistivity of higher than $1\times10^{-5}$ Ω-cm, thereby failing to provide good conductivity. In addition, the thicknesses of the silver nanoplates used in the conductive thin films of comparative embodiments 1-2 are too large, e.g. over 40 nm, resulting in poor stacking properties. Therefore, despite that the widths of these silver nanoplates are as large as over 1 μm, good film forming abilities under low temperature and good conductivity cannot be achieved.

Figure 3:
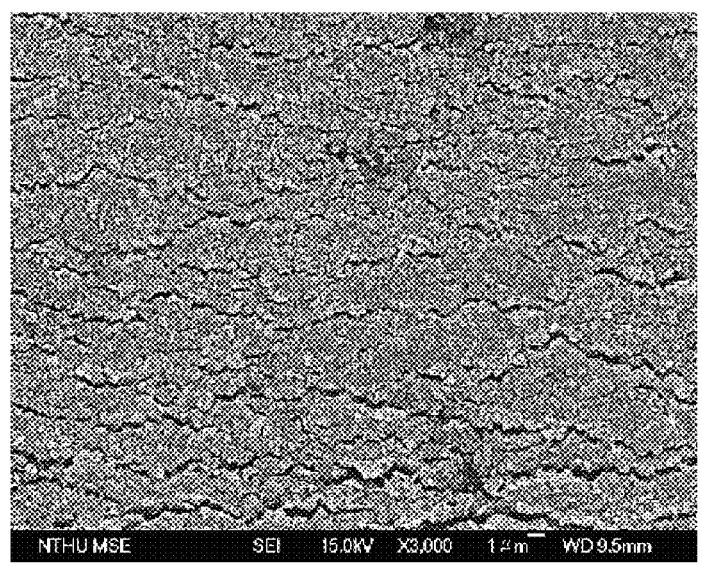
FIG. 3 is a top-view SEM image of a modified metal nanoplate according to a comparative embodiment of the present disclosure.

Please refer to FIG. 3, which is a top-view SEM image of a modified metal nanoplate according to comparative embodiment 1 of the present disclosure. As shown in FIG. 3, because the protecting agent used in comparative embodiment 1 has a high thermal decomposition temperature, a low-temperature thermal treatment at 100° C. cannot remove the protecting agent for providing a good conductivity, and moreover, the silver nanoplates used in comparative embodiment 1 are not capable of forming a compact and smoothing conductive film.

As shown in table 3, the conductive silver films of comparative embodiments 7 and 9-15 do not include a C6-C12 alkylamine, and the second protecting agents of comparative embodiment 7 and 9-15 have the following problems: the second protecting agent having a structure with too less carbons, e.g. diethylamine, n-butylamine and ethanolamine; the second protecting agent having a high thermal decomposition temperature, e.g. 2-ethylhexanoic acid and stearic acid; and the second protecting agent having a structure with too many carbons, e.g. dodecanethiol and n-octadecyl amine. Therefore, the conductive silver films of comparative embodiments 7 and 9-15 all have resistivity of higher than $1\times10^{-5}$ Ω-cm, thereby failing to provide good conductivity.

As shown in table 3, the thicknesses of the silver nanoplates used in comparative embodiments 16 and 18 are too large, and the ratio of the weight of the second protecting agent to the weight of the first protecting agent is higher than 100% for comparative embodiment 17, such that the film forming abilities are poor. Therefore, conductive silver films of comparative embodiments 16-18 all have resistivity of higher than $1\times10^{-5}$ Ω-cm, thereby failing to provide good conductivity.

Furthermore, a high temperature thermal decomposition treatment was performed on a conductive silver paste coating including silver nanoparticles to obtain a conductive silver film (comparative embodiment 19), and the conductive silver film was subjected to a bending test. The dried conductive silver film was repeatedly bent by 180° with a bending radius of 0.2 mm fifty times. The morphology of the conductive silver film was observed after the bending test is performed, and the difference between the measured resistivity before and after the bending test was measured. Some cracks were formed on the conductive silver film of the comparative embodiment 19, and the resistivity had greatly increased to 2.7 times the original resistivity. It showed that the conductivity of the conductive silver film of comparative embodiment 19 had been seriously damaged after the bending test was performed. The conductive silver film of embodiment 1 was subjected to the same bending test. The morphology of the conductive silver film of embodiment 1 showed almost free of cracks, and the resistivity did not change either. It shows that the conductive silver films of the embodiments have good and stable conductivity.

While the disclosure has been described by way of example and in terms of the exemplary embodiments, it should be understood that the disclosure is not limited thereto. On the contrary, it will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A modified metal nanoplate, comprising:
   a metal nanoplate having an average width of 0.3-20 μm and an average thickness of 10-35 nm;
   a first protecting agent disposed on a surface of the metal nanoplate, wherein the first protecting agent comprises an oxygen-containing polymer; and
   a second protecting agent disposed on the surface of the metal nanoplate, wherein the second protecting agent comprises a C6-C12 alkylamine,
   wherein the C6-C12 alkylamine comprises n-hexylamine, n-octylamine, isooctylamine, n-decylamine, n-dodecylamine, or any combination thereof.

2. The modified metal nanoplate according to claim 1, wherein the modified metal nanoplate comprises 0.1-5.0 parts by weight of the first protecting agent relative to 100 parts by weight of the metal nanoplate.

3. The modified metal nanoplate according to claim 1, wherein the modified metal nanoplate comprises 0.01-5.0 parts by weight of the second protecting agent relative to 100 parts by weight of the metal nanoplate.

4. The modified metal nanoplate according to claim 1, wherein a weight of the second protecting agent is 1-100 wt % of a weight of the first protecting agent.

5. The modified metal nanoplate according to claim 1, wherein the oxygen-containing polymer comprises polyvinyl pyrrolidone (PVP), polyvinyl alcohol (PVA), polyethylene glycol (PEG), or any combination thereof.

6. The modified metal nanoplate according to claim 1, wherein the metal nanoplate comprises silver, silver alloy, copper, copper alloy, or any combination thereof.

7. The modified metal nanoplate according to claim 1, wherein the average width of the metal nanoplate is 1-10 μm.

8. The modified metal nanoplate according to claim 1, wherein an average length of the metal nanoplate is 0.3-20 μm, wherein an extending direction of the average length is perpendicular to an extending direction of the average thickness, and the extending direction of the average length is perpendicular to an extending direction of the average width.

9. The modified metal nanoplate according to claim 1, wherein the average thickness of the metal nanoplate is 15-30 nm.

10. A conductive paste, comprising:
    a plurality of modified metal nanoplates as claimed in claim 1; and
    a solvent, wherein the modified metal nanoplates are dispersed in the solvent.

11. The conductive paste according to claim 10, wherein the solvent comprises isopropanol, diethylene glycol monoethyl ether, diethylene glycol butyl ether, diethylene glycol monoethyl ether acetate, or any combination thereof.

12. The conductive paste according to claim 10, wherein a solid content of the conductive paste is 5-80 wt %.

13. The conductive paste according to claim 10, wherein the modified metal nanoplate comprises 0.1-5.0 parts by weight of the first protecting agent relative to 100 parts by weight of the metal nanoplate.

14. The conductive paste according to claim 10, wherein the modified metal nanoplate comprises 0.01-5.0 parts by weight of the second protecting agent relative to 100 parts by weight of the metal nanoplate.

15. The conductive paste according to claim 10, wherein a weight of the second protecting agent is 1-100 wt % of a weight of the first protecting agent.

16. The conductive paste according to claim 10, wherein the oxygen-containing polymer comprises polyvinyl pyrrolidone (PVP), polyvinyl alcohol (PVA), polyethylene glycol (PEG), or any combination thereof.

17. The conductive paste according to claim 10, wherein the metal nanoplate comprises silver, silver alloy, copper, copper alloy, or any combination thereof.

18. The conductive paste according to claim 10, wherein an average length of the metal nanoplate is 0.3-20 μm, wherein an extending direction of the average length is perpendicular to an extending direction of the average thickness, and the extending direction of the average length is perpendicular to an extending direction of the average width.

\* \* \* \* \*